United States Patent
Azuma et al.

(10) Patent No.: US 10,670,509 B2
(45) Date of Patent: Jun. 2, 2020

(54) CONTROL APPARATUS, CONTROL SYSTEM, ANALYSIS APPARATUS, PARTICLE SEPARATION/COLLECTION APPARATUS, CONTROL METHOD, AND LAMINAR FLOW CONTROL PROGRAM

(71) Applicant: Sony Corporation, Tokyo (JP)

(72) Inventors: Hiroko Azuma, Chiba (JP); Yasunobu Kato, Kanagawa (JP); Fumitaka Otsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 232 days.

(21) Appl. No.: 15/520,984

(22) PCT Filed: Sep. 14, 2015

(86) PCT No.: PCT/JP2015/075966
  § 371 (c)(1),
  (2) Date: Apr. 21, 2017

(87) PCT Pub. No.: WO2016/067772
  PCT Pub. Date: May 6, 2016

(65) Prior Publication Data
  US 2018/0024039 A1    Jan. 25, 2018

(30) Foreign Application Priority Data

Oct. 30, 2014    (JP) .................. 2014-221035

(51) Int. Cl.
  *G01N 15/14*    (2006.01)
  *G05D 7/06*    (2006.01)
(52) U.S. Cl.
  CPC ......... *G01N 15/1404* (2013.01); *G01N 15/14* (2013.01); *G05D 7/06* (2013.01); *G01N 2015/1409* (2013.01)

(58) Field of Classification Search
  CPC ............... G01N 15/1404; G01N 15/14; G01N 2015/1409; G05D 7/06
  See application file for complete search history.

(56) References Cited

U.S. PATENT DOCUMENTS

| 5,245,318 A | 9/1993 | Tohge et al. |
| 2013/0343149 A1* | 12/2013 | Fox .................... B01F 13/0059 366/138 |

(Continued)

FOREIGN PATENT DOCUMENTS

| JP | 64-088251 A | 4/1989 |
| JP | 04-098305 A | 3/1992 |

(Continued)

OTHER PUBLICATIONS

Written Opinion and English translation thereof dated Nov. 2, 2015 in connection with International Application No. PCT/JP2015/075966.

(Continued)

*Primary Examiner* — Benjamin R Whatley
(74) *Attorney, Agent, or Firm* — Wolf, Greenfield & Sacks, P.C.

(57) ABSTRACT

A technology is provided, capable of reducing the time required for the flow velocity of a laminar flow to stabilize, and of providing more finely responsive control. The present technology provides a control apparatus for controlling a flow velocity of a laminar flow, the apparatus including: a pressurization unit configured to pressurize a fluid that is to form the laminar flow; an air pressure measurement unit configured to measure a pressure applied to the fluid by the pressurization unit; a water pressure measurement unit configured to measure a water pressure of the fluid pressurized by the pressurization unit; and a control unit configured to control pressure force applied to the fluid by the pressurization unit on the basis of either the air (Continued)

pressure measured by the air pressure measurement unit or the water pressure measured by the water pressure measurement unit, wherein the control unit provides switching between control based on the air pressure measured by the air pressure measurement unit and control based on the water pressure measured by the water pressure measurement unit.

3 Claims, 12 Drawing Sheets

(56) References Cited

U.S. PATENT DOCUMENTS

2015/0068957 A1* 3/2015 Otsuka .................. B07C 5/3422
209/577
2015/0177121 A1* 6/2015 Takahashi .......... G01N 15/1404
209/577

FOREIGN PATENT DOCUMENTS

WO   WO-2014038640 A1 *  3/2014   ......... G01N 15/1404
WO   WO 2014/115409 A1    7/2014

OTHER PUBLICATIONS

International Preliminary Report on Patentability and English translation thereof dated May 11, 2017 in connection with International Application No. PCT/JP2015/075966.

\* cited by examiner

CONTROL APPARATUS, CONTROL SYSTEM, ANALYSIS APPARATUS, PARTICLE SEPARATION/COLLECTION APPARATUS, CONTROL METHOD, AND LAMINAR FLOW CONTROL PROGRAM

CROSS-REFERENCE TO RELATED APPLICATIONS

The present Application is a U.S. National Stage entry under 35 U.S.C. § 371 of International Application No. PCT/JP2015/075966, filed in the Japan Patent Office on Sep. 14, 2015, which claims priority to Patent Application No. JP2014-221035, filed in the Japan Patent Office on Oct. 30, 2014, each of which is incorporated by reference herein in its entirety.

TECHNICAL FIELD

The present technology relates to a control apparatus for controlling a flow velocity of a laminar flow, and more particularly, to a control apparatus, a control system, an analysis apparatus, a particle separation/collection apparatus, a control method, and a laminar flow control program each for controlling a flow velocity of a laminar flow, for use in analysis, separation/collection, and/or the like, of microparticles etc. contained in the laminar flow.

BACKGROUND ART

As analysis techniques have advanced in recent years, techniques are being developed in which microparticles such as biological microparticles (including cells and microorganisms), microbeads, and/or the like, are transported through a flow channel, the microparticles are individually measured in a transport step, and the microparticles that have been measured are analyzed and/or separated/collected. As one representative example of such a technique of analyzing or separating/collecting microparticles using a flow channel, an analysis technique called flow cytometry is being rapidly improved in technology.

Flow cytometry is an analysis technique that analyzes and separates/collects microparticles by introducing analyte microparticles into a fluid in a linear arrangement, irradiating the microparticles with laser light or the like, and thus detecting fluorescence and/or scattered light emitted from each of the microparticles. A process of flow cytometry can be broadly grouped into: (1) water flow part, (2) optical part, (3) electrical/analytical part, and (4) separation/collection part described above.

(1) Water Flow Part

In the water flow part, analyte microparticles are arranged in a linear arrangement in a flow cell (flow channel). More specifically, a sheath flow is introduced into the flow cell at a constant flow velocity, in which condition a sample flow containing the microparticles is gently introduced into a center portion of the flow cell. In this situation, the flows do not mix with each other due to the principle of laminar flow, and thus a flow arranged in layers (laminar flow) is formed. The inflows of the sheath flow and of the sample flow are then adjusted on the basis of the sizes etc. of the analyte microparticles to transport each of the microparticles therethrough in a linear arrangement.

(2) Optical Part

In the optical part, analyte microparticles are irradiated with light, such as laser, and fluorescence and/or scattered light emitted from the microparticles is detected. In the water flow part (1) mentioned above, the microparticles are transported through a laser irradiation portion while each being arranged in a linear arrangement, and each time one microparticle passes therethrough, fluorescence and/or scattered light emitted from that microparticle is detected using an optical detector on a per-parameter basis to analyze characteristics of the individual microparticles.

(3) Electrical/Analytical Part

In the electrical/analytical part, optical information detected in the optical part is converted into an electrical signal (voltage pulse). The electrical signal generated by conversion is digitized by analog-to-digital conversion, and a histogram is computed from the resulting data for analysis, using an analyzing computer and software.

(4) Separation/Collection Part

In the separation/collection part, the microparticles that have undergone measurement are separated and collected. One representative method of separation/collection is a method including positively or negatively charging the microparticles that have undergone measurement, interposing the flow cell between two deflection plates having a potential difference therebetween, and allowing the electrically charged microparticles to be attracted toward one of the deflection plates depending on the electric charge thereof, thereby to perform separation/collection.

A technology for analyzing and separating/collecting microparticles in a flow channel, such as flow cytometry, is widely used in various fields, such as medical, drug discovery, clinical examination, food, agricultural, engineering, forensic medicine, criminal identification fields. Particularly in the medical field, such a technology plays an important role in pathology, tumor immunology, transplantation medicine, genetics, regenerative medicine, chemotherapy, and the like.

Thus, a technology for analyzing and separating/collecting microparticles in a flow channel is needed in a very wide range of fields. Technologies in relation to the processes (1) to (4) described above are also being developed. For example, as a technology in relation to the (1) water flow part described above, Patent Document 1 discloses a technology for controlling a flow velocity of a sheath fluid by providing a pressure sensor in a flow channel of the sheath fluid, and by changing a value of the pressure exerted on the sheath fluid on the basis of the water pressure sensed by the pressure sensor.

CITATION LIST

Patent Document

Patent Document 1: Japanese Patent Application Laid-Open No. 64-88251

SUMMARY OF THE INVENTION

Problems to be Solved by the Invention

Performing analysis, separation/collection, and/or the like, of microparticles etc. contained in a laminar flow requires the microparticles etc. to pass through a channel each in a linear arrangement. Therefore, control of the flow velocity of the laminar flow, such as a sample flow and a sheath flow, is highly important partly for improving accuracy in analysis and in separation/collection. As has been stated, control of a flow velocity of a laminar flow has been provided by changing a value of the pressure exerted on the fluid on the basis of a water pressure of the fluid.

However, pressurization to a fluid first increases a pressure in a vessel that contains the fluid, and thus it takes time to achieve an increase in the water pressure of the fluid that will be discharged from the vessel through the flow channel. Therefore, a problem exists in that feedback control based on the water pressure of a fluid may cause the pressure to overshoot. In particular, a less amount of the fluid in the vessel requires more time for the vessel to be filled with air, which in turn requires still more time to achieve an increase in the water pressure of the fluid that will be discharged from the vessel through the flow channel. This will cause the pressure to further overshoot. As a result, a problem exists in that a significant time is required for the water pressure of the fluid to be stabilized at a desired value.

On the other hand, control based on an air pressure that pressurizes the fluid is incapable of taking into consideration the amount of the fluid in the vessel or a change in water viscosity caused by a temperature change. This poses a problem in that highly responsive control cannot be provided.

It is, therefore, a primary object of the present technology to provide a technology capable of reducing the time required for the flow velocity of a laminar flow to stabilize, and of providing more finely responsive control.

Solutions to Problems

The present inventors have conducted intensive studies to achieve the foregoing object, and by having regard to the characteristics of air pressure-based control and of water pressure-based control, the present inventors have been successful in reducing the time required for control by providing switching of the control. Thus, the present technology has been developed.

That is, the present technology first provides a control apparatus for controlling a flow velocity of a laminar flow, the apparatus including:

a pressurization unit configured to pressurize a fluid that is to form the laminar flow;

an air pressure measurement unit configured to measure a pressure applied to the fluid by the pressurization unit;

a water pressure measurement unit configured to measure a water pressure of the fluid pressurized by the pressurization unit; and a control unit configured to control pressure force applied to the fluid by the pressurization unit on the basis of either the air pressure measured by the air pressure measurement unit or the water pressure measured by the water pressure measurement unit, wherein the control unit provides switching between control based on the air pressure measured by the air pressure measurement unit and control based on the water pressure measured by the water pressure measurement unit.

In the control apparatus according to the present technology, the direction of the switching in the control unit may be changed according to the purpose as appropriate. For example, the control unit may provide switching from control based on the air pressure measured by the air pressure measurement unit to control based on the water pressure measured by the water pressure measurement unit.

In this case, the timing of the switching in the control unit is not particularly limited. However, switching may be performed from the control based on the air pressure measured by the air pressure measurement unit to the control based on the water pressure measured by the water pressure measurement unit after stabilization of the air pressure measured by the air pressure measurement unit.

In addition, more specifically, for example, the control unit may provide switching from the control based on the air pressure measured by the air pressure measurement unit to the control based on the water pressure measured by the water pressure measurement unit, at one or more time points selected from the time points (a) to (c):

(a) when a differential pressure between the air pressure measured by the air pressure measurement unit and the water pressure measured by the water pressure measurement unit reaches a predetermined value or below, (b) when an amount of variation in the water pressure measured by the water pressure measurement unit reaches a predetermined value or below, and (c) when a duration time of the control based on the air pressure measured by the air pressure measurement unit exceeds a predetermined time period.

The laminar flow controllable by the control apparatus according to the present technology is nor particularly limited. However, for example, the laminar flow may be formed of a sample flow containing a sample, and of a sheath flow surrounding the sample flow, and the fluid may be a sheath fluid that is to form the sheath flow.

The control unit may also determine on the switching from the control based on the air pressure measured by the air pressure measurement unit to the control based on the water pressure measured by the water pressure measurement unit in order from (1) to (3):

(1) determination of whether the differential pressure between the air pressure measured by the air pressure measurement unit and the water pressure measured by the water pressure measurement unit has reached the predetermined value or below, (2) determination of whether the amount of variation in the water pressure measured by the water pressure measurement unit has reached the predetermined value or below, and (3) determination of whether the duration time of the control based on the air pressure measured by the air pressure measurement unit has exceeded the predetermined time period.

The present technology secondly provides a control system for controlling a flow velocity of a laminar flow, the system including:

a pressurization apparatus configured to pressurize a fluid that is to form the laminar flow;

an air pressure measurement apparatus configured to measure a pressure applied to the fluid by the pressurization apparatus;

a water pressure measurement apparatus configured to measure a water pressure of the fluid pressurized by the pressurization apparatus; and a control apparatus configured to control pressure force applied to the fluid by the pressurization apparatus on the basis of either the air pressure measured by the air pressure measurement apparatus or the water pressure measured by the water pressure measurement apparatus, wherein the control apparatus provides switching between control based on the air pressure measured by the air pressure measurement apparatus and control based on the water pressure measured by the water pressure measurement apparatus.

In the control system according to the present technology, at least apart of the apparatuses may be connected to each other via a network.

The present technology further provides an analysis apparatus for analyzing a particle in a laminar flow formed of a sample flow containing the particle, and of a sheath flow surrounding the sample flow, the apparatus including:

a pressurization unit configured to pressurize a sheath fluid that is to form the sheath flow;

an air pressure measurement unit configured to measure a pressure applied to the sheath fluid by the pressurization unit;

a water pressure measurement unit configured to measure a water pressure of the sheath fluid pressurized by the pressurization unit; and a control unit configured to control pressure force applied to the sheath fluid by the pressurization unit on the basis of either the air pressure measured by the air pressure measurement unit or the water pressure measured by the water pressure measurement unit, wherein the control unit provides switching between control based on the air pressure measured by the air pressure measurement unit and control based on the water pressure measured by the water pressure measurement unit.

The present technology further provides a particle separation/collection apparatus for separating/collecting a particle in a laminar flow formed of a sample flow containing the particle, and of a sheath flow surrounding the sample flow, the apparatus including:

a pressurization unit configured to pressurize a sheath fluid that is to form the sheath flow;

an air pressure measurement unit configured to measure a pressure applied to the sheath fluid by the pressurization unit;

a water pressure measurement unit configured to measure a water pressure of the sheath fluid pressurized by the pressurization unit; and a control unit configured to control pressure force applied to the sheath fluid by the pressurization unit on the basis of either the air pressure measured by the air pressure measurement unit or the water pressure measured by the water pressure measurement unit, wherein the control unit provides switching between control based on the air pressure measured by the air pressure measurement unit and control based on the water pressure measured by the water pressure measurement unit.

The present technology additionally provides a laminar flow control method for controlling a flow velocity of a laminar flow, the method including:

a pressurization step of pressurizing a fluid that is to form the laminar flow;

an air pressure measurement step of measuring a pressure applied to the fluid in the pressurization step;

a water pressure measurement step of measuring a water pressure of the fluid pressurized in the pressurization step; and a control step of controlling pressure force applied to the fluid in the pressurization step on the basis of either the air pressure measured in air pressure measurement step or the water pressure measured in the water pressure measurement step, wherein the control step provides switching between control based on the air pressure measured in the air pressure measurement step and control based on the water pressure measured in the water pressure measurement step.

The present technology further provides a laminar flow control program used for controlling a flow velocity of a laminar flow, and for causing a computer to perform:

a first control function that controls pressure force applied to the fluid, on the basis of an air pressure applied to a fluid that is to form the laminar flow;

a second control function that controls the pressure force applied to the fluid, on the basis of a water pressure of the fluid that is to form the laminar flow; and a switching control function that provides switching between performance of the first control function and performance of the second control function.

A technical term used in the present technology will now be defined. As used in the present technology, the term "particle" encompasses all that can pass through a sample flow, including biologically relevant microparticles, such as cells, microorganisms, liposomes, DNAs, and proteins; and synthetic particles, such as latex particles, gel particles, and industrial particles.

Effects of the Invention

According to the present technology, when analysis, separation/collection, and/or the like of microparticles etc. contained in a laminar flow is performed, the time required for the flow velocity of the laminar flow to stabilize can be reduced, and more finely responsive control of the laminar flow can be provided.

Note that the effects described here is not necessarily a limitation, but the effects may be any effect described in the present technology.

MODE FOR CARRYING OUT THE INVENTION

Figure 1:
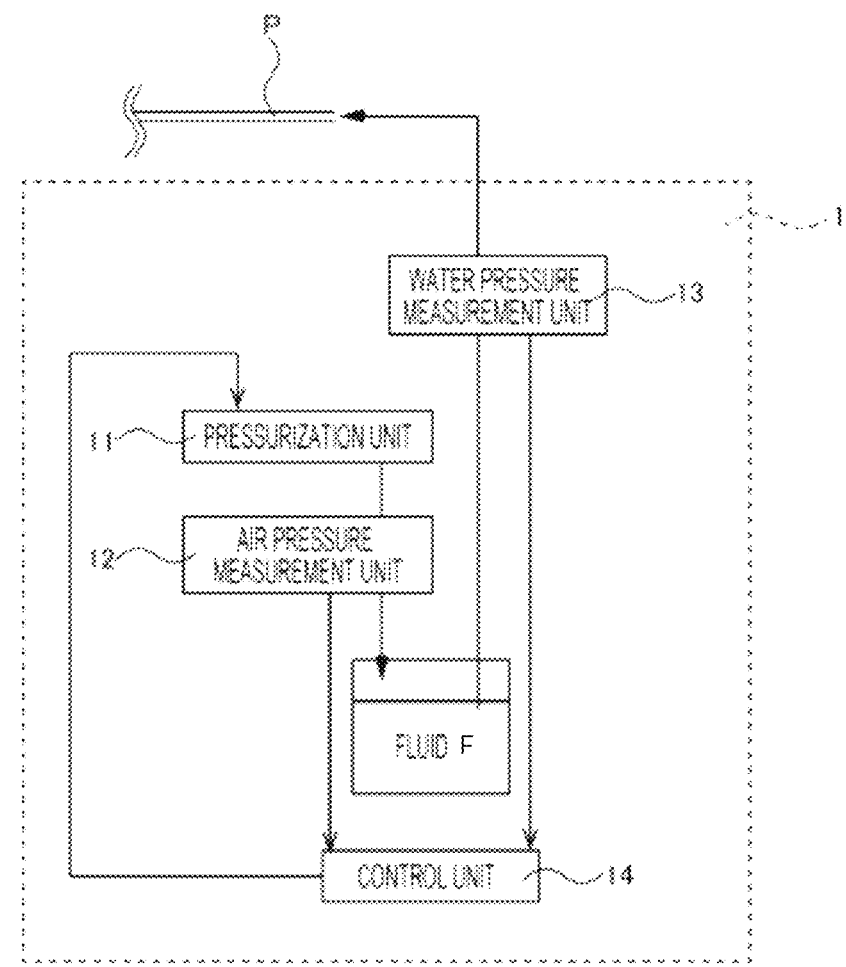
FIG. 1 is a conceptual schematic diagram schematically illustrating a first embodiment of a control apparatus 1 according to the present technology.

Preferred embodiments for practicing the present technology will be described below with reference to the drawings. The embodiments described below are merely examples of representative embodiments of the present technology, and should not be construed as limiting the scope of the present technology. Note that the description is provided in the order shown below.

1. Control apparatus 1
  (1) Pressurization unit 11
  (2) Air pressure measurement unit 12
  (3) Water pressure measurement unit 13
  (4) Control unit 14
2. Control system 10
  (1) Pressurization apparatus 110
  (2) Air pressure measurement apparatus 120
  (3) Water pressure measurement apparatus 130
  (4) Control apparatus 140
3. Analysis apparatus and particle separation/collection apparatus
  (1) Flow channel P
  (2) Light irradiation unit 111
  (3) Light detection unit 112
  (4) Analysis unit 113
  (5) Separation/collection unit 121
4. Control method
  (1) Pressurization step I
  (2) Air pressure measurement step II
  (3) Water pressure measurement step III
  (4) Control step IV
5. Analysis method and particle separation/collection method
  (1) Transport step V
  (2) Light irradiation step VI
  (3) Light detection step VII
  (4) Analysis step VIII
  (5) Separation/collection step IX
6. Analysis program
  (1) First control function
  (2) Second control function
  (3) Switching control function <1. Control Apparatus 1>

Figure 3:
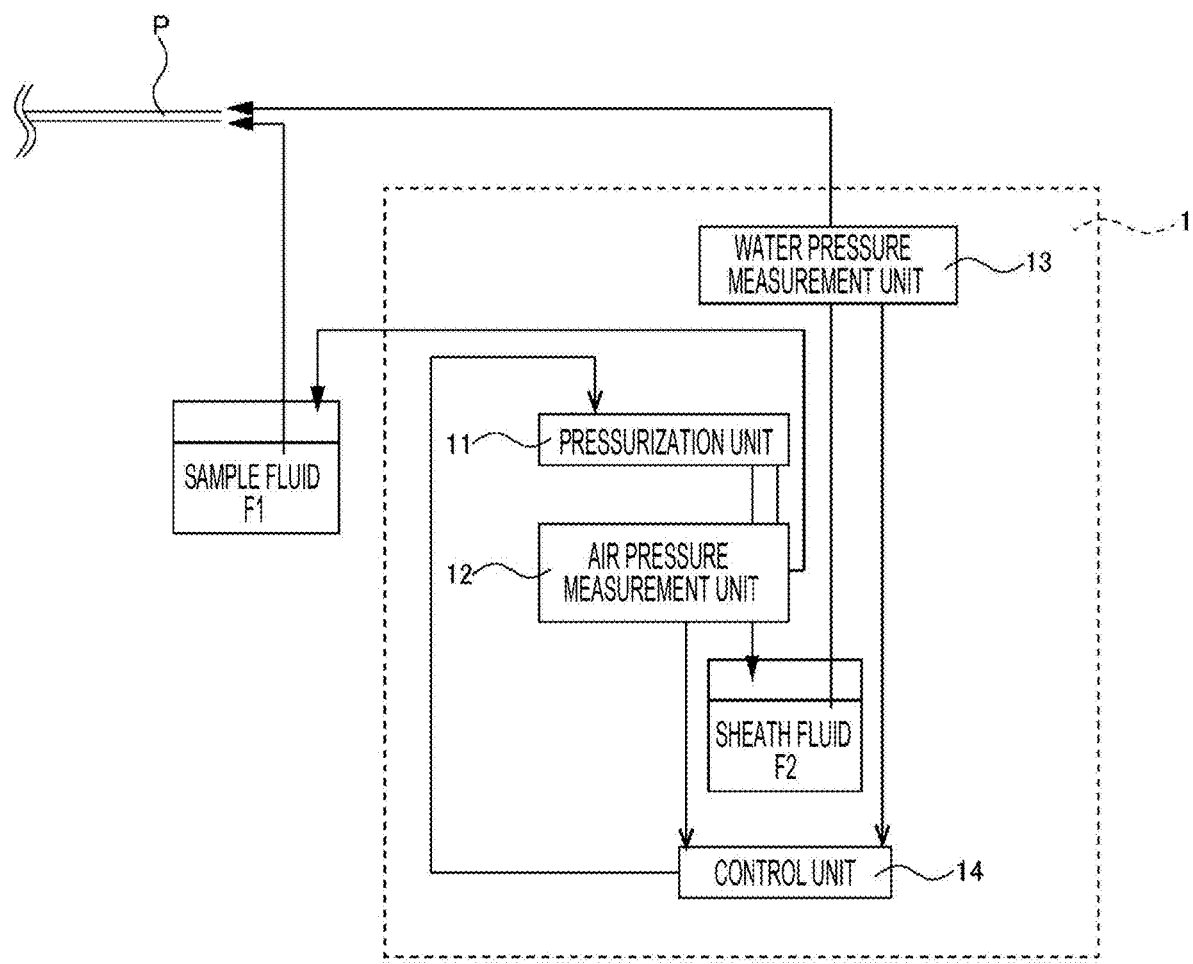
FIG. 3 is a conceptual schematic diagram schematically illustrating with a second embodiment of the control apparatus 1 according to the present technology.
Figure 4:
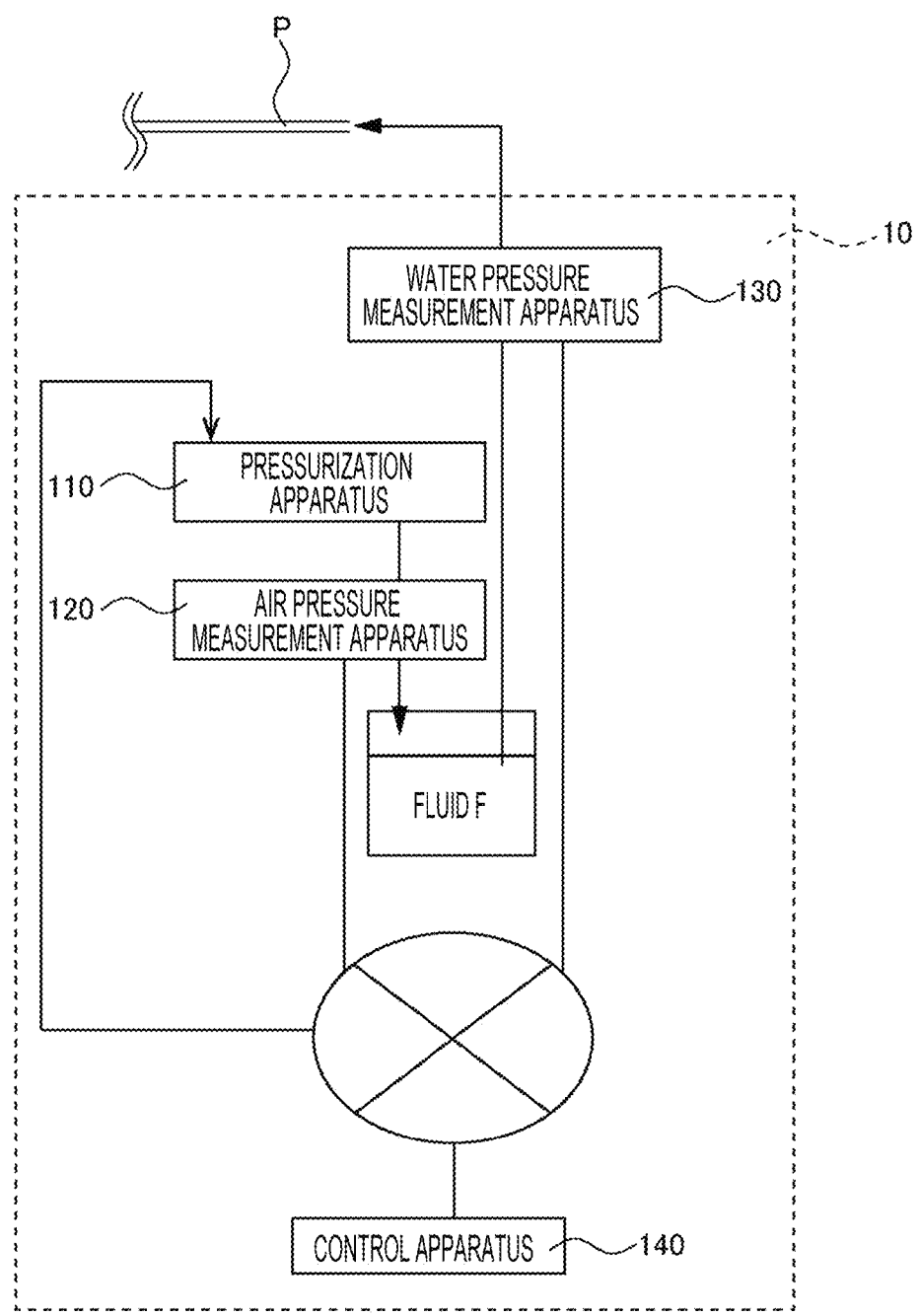
FIG. 4 is a conceptual schematic diagram schematically illustrating a first embodiment of a control system 10 according to the present technology.

FIG. 1 is a conceptual schematic diagram schematically illustrating a first embodiment of a control apparatus 1 according to the present technology. The control apparatus 1 according to the present technology is a control apparatus for controlling a flow velocity of a laminar flow, and includes at least, in terms of broad groupings, a pressurization unit 11, an air pressure measurement unit 12, a water pressure measurement unit 13, and a control unit 14. Each of these units will be hereinafter described in detail. Note that although FIG. 1 and after-mentioned FIGS. 3 and 4 show a flow channel P for purposes of illustration, the flow channel P is not included in the control apparatus 1 according to the present technology.

(1) Pressurization Unit 11

In the pressurization unit 11, a pressure is applied to a fluid F that is to form a laminar flow. The method of pressurization in the pressurization unit 11 is not particularly limited, and any publicly known pressurization method may be arbitrarily selected and used. For example, pressurization may be performed by supplying compressed air into the vessel that contains the fluid using a compressed air source, such as a compressor, and an electro-pneumatic regulator and the like, and/or by other method.

(2) Air Pressure Measurement Unit 12

In the air pressure measurement unit 12, measurement is made of the pressure applied to the fluid F by the pressurization unit 11. A publicly known pressure meter may be arbitrarily selected and used in the air measurement unit 12 of the control apparatus 1 according to the present technology.

(3) Water Pressure Measurement Unit 13

In the water pressure measurement unit 13, measurement is made of the water pressure of the fluid F pressurized by the pressurization unit 11. A publicly known water pressure meter may be arbitrarily selected and used in the water pressure measurement unit 13 of the control apparatus 1 according to the present technology.

(4) Control Unit 14

In the control unit 14, control of the pressure force applied to the fluid F by the pressurization unit 11 is provided on the basis of either the air pressure measured by the air pressure measurement unit 12, or the water pressure measured by the water pressure measurement unit 13.

The control apparatus 1 according to the present technology is characterized in that switching is performed in this control unit 14 between control based on the air pressure measured by the air pressure measurement unit 12 (hereinafter also referred to simply as "air pressure-based control") and control based on the water pressure measured by the water pressure measurement unit 13 (hereinafter also referred to simply as "water pressure-based control"). Appropriately switching between the air pressure-based control and the water pressure-based control depending on the situation can reduce the time required for the flow velocity of the laminar flow to stabilize, and provide more finely responsive control that takes into consideration the amount of the fluid in the vessel and a change in water viscosity caused by a temperature change.

In the control apparatus according to the present technology, the direction of the switching in the control unit may be changed according to the purpose as appropriate. For example, the switching may be in a direction from the air pressure-based control to the water pressure-based control, or in a direction from the water pressure-based control to the air pressure-based control. Moreover, there are no limitations with respect to the number of switching operations, and switching may thus be performed as many times as needed according to the situation and/or the purpose; e.g., switching may be performed such that the air pressure-based control is switched to the water pressure-based control, and then the control may further be switched back to the air pressure-based control.

The present technology prefers, in particular, that air pressure-based control be performed in an early stage of forming a laminar flow, and then the control be switched to water pressure-based control. Performing air pressure-based control in an early stage can reduce the time required for the flow velocity of the laminar flow to stabilize, and switching thereafter to water pressure-based control can provide more finely responsive control that takes into consideration the amount of the fluid in the vessel and a change in water viscosity caused by a temperature change.

The timing of switching from air pressure-based control to water pressure-based control is nor particularly limited, and may be appropriately set depending on the situation. The present technology prefers, in particular, that switching be performed from air pressure-based control to water pressure-based control after the air pressure measured by the air pressure measurement unit 12 stabilizes. Once the air pressure has stabilized, the pressure is very unlikely to overshoot even if the control is switched to the water pressure-based control. Thus, the time required to stabilize the fluid to a desired water pressure can be more effectively reduced.

Figure 2:
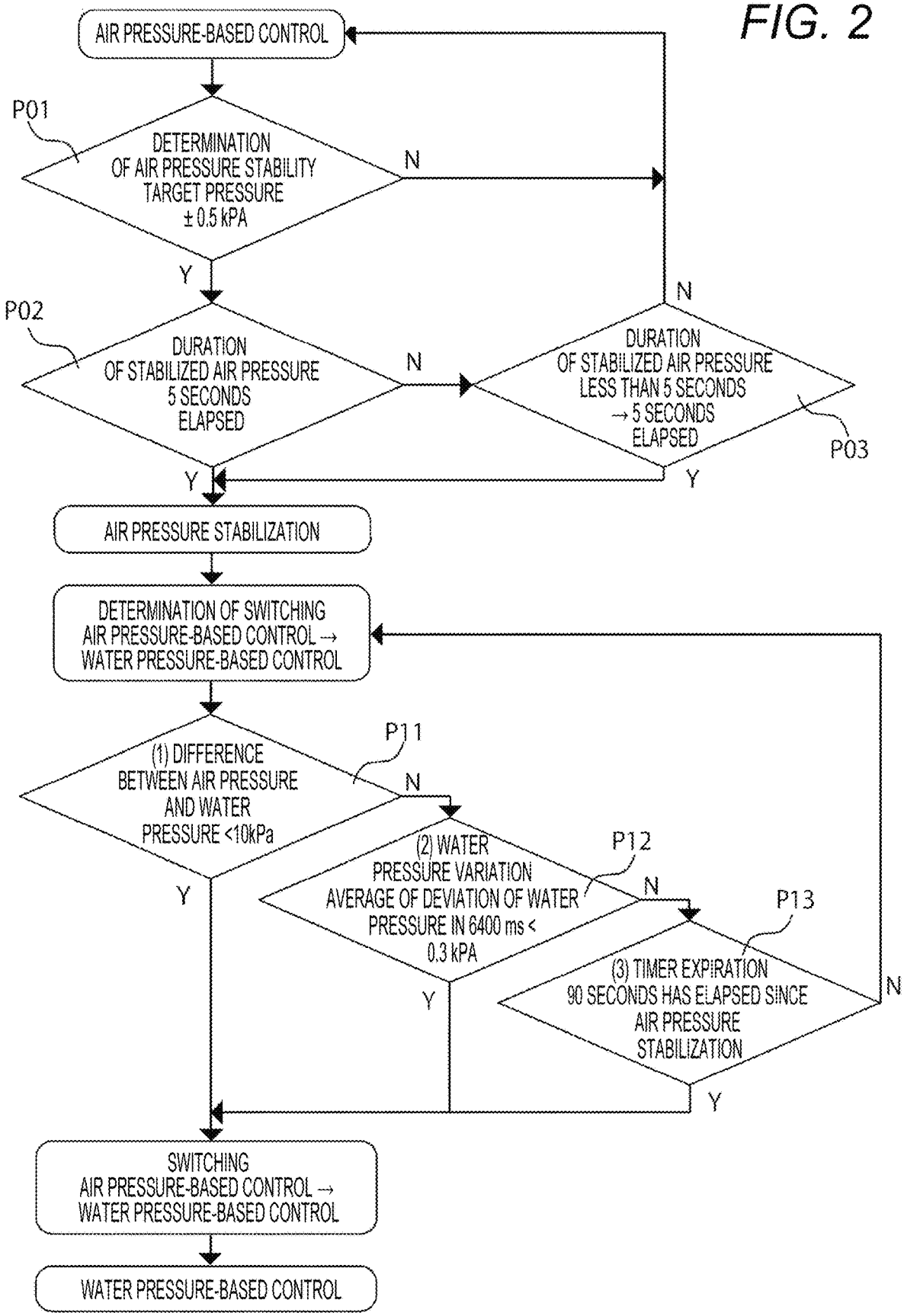
FIG. 2 is a flowchart illustrating one example of timing of switching from air pressure-based control to water pressure-based control in the control apparatus 1 according to the present technology.

A specific example of the timing of switching from air pressure-based control to water pressure-based control will be described in more detail using FIG. 2. FIG. 2 is a flowchart illustrating one example of the timing of switching from air pressure-based control to water pressure-based control in the control apparatus 1 according to the present technology.

First, when pressurization to the fluid F is started, the air pressure measurement unit 12 monitors the pressure applied to the fluid F, and the control unit 14 starts air pressure-based control. Next, stability of the air pressure monitored by the air pressure measurement unit 12 is determined. The method for determining stability of the air pressure is not particularly limited. Examples thereof include a method including determining that stability is reached when the air pressure measured falls within a specific range relative to a target air pressure, and a specific amount of time has elapsed since the air pressure measured has fallen within the range of the target air pressure.

FIG. 2 illustrates one example of determining that stability is reached if a condition of target air pressure±0.5 kPa has lasted for 5 seconds. More specifically, if the air pressure measured falls within a range of target air pressure±0.5 kPa (hereinafter also referred to as "stable air pressure range") (see "P01" in FIG. 2), measurement of the duration time of continued stable air pressure is started (see "P02" in FIG. 2); and when 5 seconds has elapsed, the process proceeds to determination of switching from air pressure-based control to water pressure-based control. If the stable air pressure range is exceeded before 5 seconds elapses, the process waits for a specific period of time until the elapsed time in the stable air pressure range reaches 5 seconds (see "P03" in FIG. 2); and when the elapsed time in the stable air pressure range reaches 5 seconds, the process proceeds to determination of switching from air pressure-based control to water pressure-based control. If the specific period of time expires before the elapsed time in the stable air pressure range reaches 5 seconds, the air pressure-based control is performed again, and thus the process returns to the determination of air pressure stability of P01. This process continues until the air pressure stabilizes.

When the process proceeds to the determination of switching from air pressure-based control to water pressure-based control, first, it is determined whether a differential pressure between the air pressure measured by the air pressure measurement unit 12 and the water pressure measured by the water pressure measurement unit 13 has reached a predetermined value or below (see "P11" in FIG. 2). FIG. 2 shows an example in which it is determined that switching can be performed if the difference between the air pressure and the water pressure is below 10 kPa.

If the differential pressure between the air pressure measured by the air pressure measurement unit 12 and the water pressure measured by the water pressure measurement unit 13 has not yet reached the predetermined value or below, it is determined whether the amount of variation in the water pressure measured by the water pressure measurement unit 13 has reached a predetermined value or below (see "P12" in FIG. 2). FIG. 2 shows an example in which it is determined that switching can be performed if the average of deviation of the water pressure during a time period of 6400 ms is below 0.3 kPa.

Even if the amount of variation in the water pressure measured by the water pressure measurement unit 13 has not yet reached the predetermined value or below, when the duration time of the control based on the air pressure measured by the air pressure measurement unit 12 exceeds a predetermined time period (see "P13" in FIG. 2), switching is performed without condition. FIG. 2 shows an example in which switching is performed without condition when 90 seconds has elapsed since the air pressure has stabilized.

As described above, the control unit of the control apparatus 1 according to the present technology performs hierarchical determination and determination based on timer expiration as appropriate, and thus achieves reduction in the time required for the flow velocity of the laminar flow to stabilize.

FIG. 3 is a conceptual schematic diagram schematically illustrating with a second embodiment of the control apparatus 1 according to the present technology. The second embodiment shown in FIG. 3 is an example of using the control apparatus 1 according to the present technology for controlling the flow velocity of a sheath flow F2, in a laminar flow formed of a sample flow F1 containing a sample and of the sheath flow F2 surrounding the sample flow F1.

The control apparatus 1 according to the present technology is capable of controlling the flow velocities of both the sample flow F1 and the sheath flow F2, but is preferably used, in particular, for controlling the flow velocity of the sheath flow F2. The reason is as follows: the amount of the sample flow F1 is often less than the amount of the sheath flow F2; thus, the flow velocity of the sample flow F1 is relatively easy to control, and is therefore often controllable without using a special control technology such as the control apparatus 1 according to the present technology.

<2. Control System 10>

FIG. 4 is a conceptual schematic diagram schematically illustrating a first embodiment of a control system 10 according to the present technology. The control system 10 according to the present technology is a control system for controlling a flow velocity of a laminar flow, and includes at least, in terms of broad groupings, a pressurization apparatus 110, an air pressure measurement apparatus 120, a water pressure measurement apparatus 130, and a control apparatus 140. Note that the details of the pressurization apparatus 110, the air pressure measurement apparatus 120, the water pressure measurement apparatus 130, and the control apparatus 140 are the same, respectively, as those described above for the pressurization unit 11, the air pressure measurement unit 12, the water pressure measurement unit 13, and the control unit 14 of the control apparatus 1 according to the present technology, and explanation thereof is thus omitted here.

In the control system 10 according to the present technology, a part or all of the apparatuses may be connected to each other via a network.

<3. Analysis Apparatus and Particle Separation/Collection Apparatus>

The control apparatus 1 and the control system 10 according to the present technology can each be suitably used as a control mechanism in an analysis apparatus for analyzing a particle S in a laminar flow, or in a particle separation/collection apparatus for separating/collecting a particle S in a laminar flow.

Figure 5:
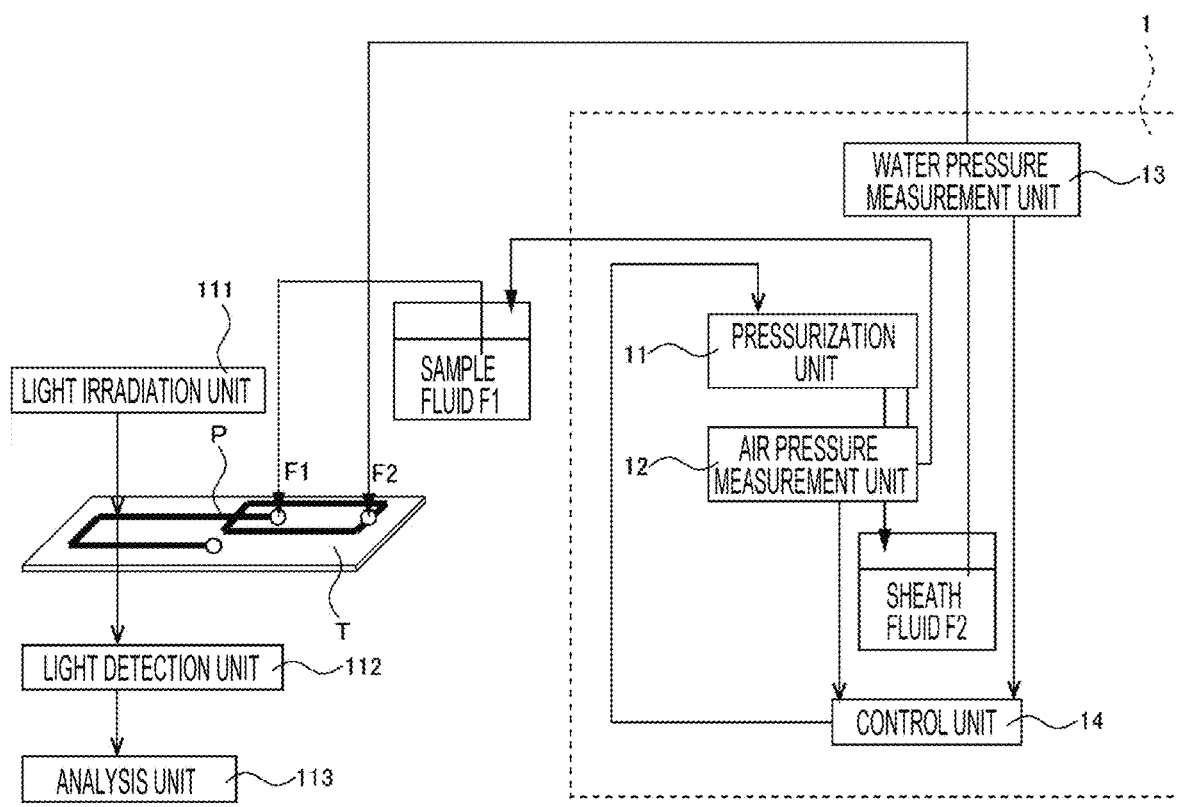
FIG. 5 is a conceptual schematic diagram schematically illustrating a first embodiment of an analysis apparatus 11 according to the present technology.
Figure 6:
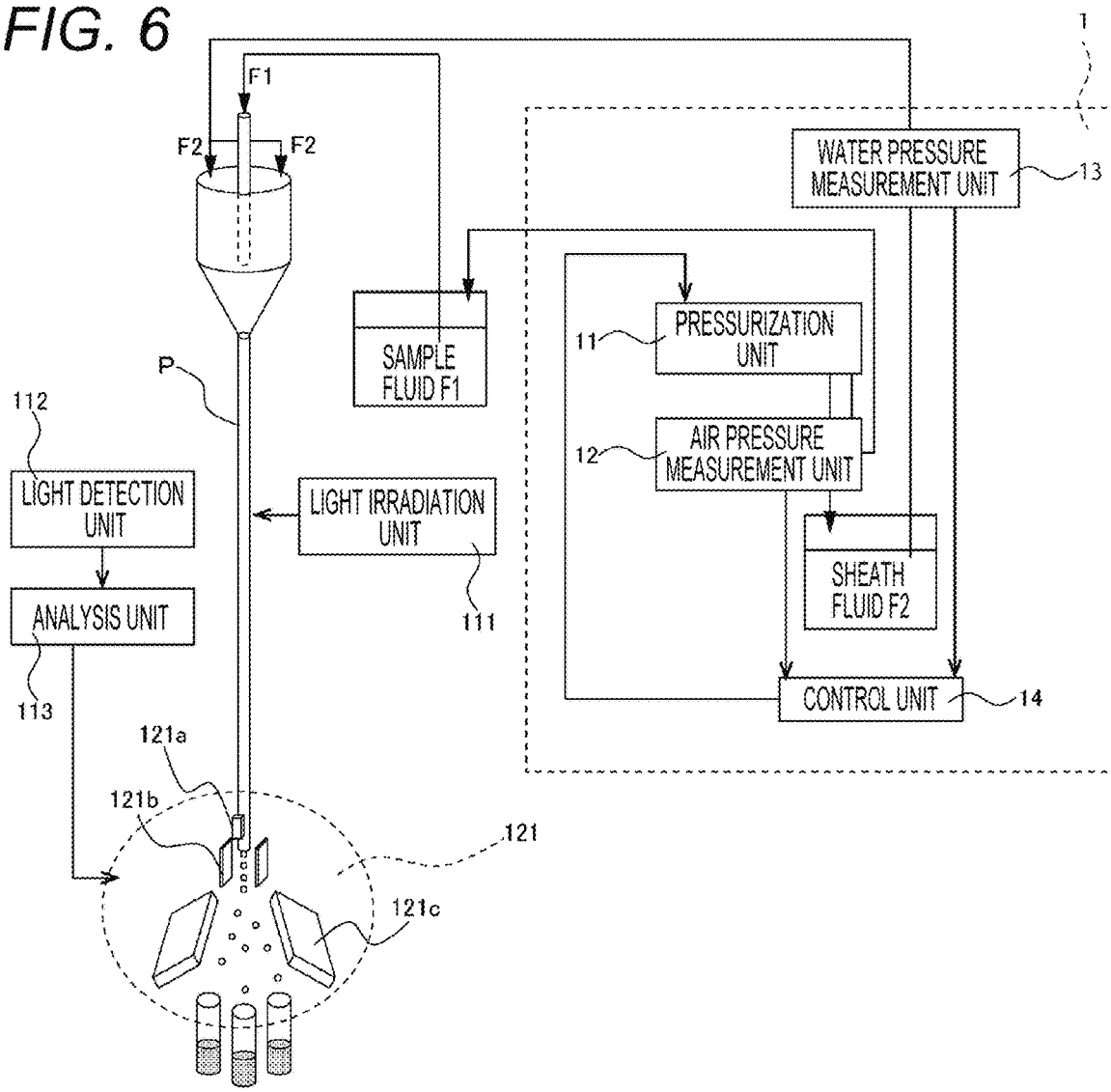
FIG. 6 is a conceptual schematic diagram schematically illustrating a first embodiment of a particle separation/collection apparatus 12 according to the present technology.

FIG. 5 is a conceptual schematic diagram schematically illustrating a first embodiment of an analysis apparatus according to the present technology. FIG. 6 is a conceptual schematic diagram schematically illustrating a first embodiment of a particle separation/collection apparatus according to the present technology. The control apparatus 1 used in the analysis apparatus shown in FIG. 5, and used in the particle separation/collection apparatus shown in FIG. 6 is the same as that described above, and explanation thereof is thus omitted here.

In addition to the control apparatus 1 according to the present technology described above, the analysis apparatus and the particle separation/collection apparatus according to the present technology may include various functions commonly included in a publicly known analysis apparatus and particle separation/collection apparatus (such as what is called flow cytometer) and the like. Specifically, a light irradiation unit 111, a light detection unit 112, an analysis unit 113, a separation/collection unit 121, and the like may be included. In addition, a flow channel P may also be provided as needed. Each of these units will be hereinafter described in detail.

(1) Flow Channel P

The flow channel P may be originally provided in the analysis apparatus and the particle separation/collection apparatus according to the present technology; or otherwise, a commercially available flow channel P or disposable chip having a flow channel P may be placed in the analysis apparatus and in the particle separation/collection apparatus for performing analysis or separation/collection.

The form of a flow channel P usable in the analysis apparatus and in the particle separation/collection apparatus according to the present technology is not particularly limited, and may be arbitrarily designed. For example, it is not limited to the flow channel P formed in a two- or three-dimensional substrate T formed of plastic or glass as shown in the analysis apparatus of FIG. 5, but as shown in the particle separation/collection apparatus of FIG. 6, a flow channel P such as one used in a conventional flow cytometer may also be used in the analysis apparatus and in the particle separation/collection apparatus according to the present technology.

Furthermore, the flow channel width, the flow channel depth, and the flow channel cross-sectional shape of the flow channel P described above are not particularly limited as long as that form allows a laminar flow to be formed, and may be arbitrarily designed. For example, a micro-flow channel having a flow channel width of 1 mm or less may also be used in the analysis apparatus and in the particle separation/collection apparatus according to the present technology. In particular, a micro-flow channel having a flow channel width of about 10 μm or more and about 1 mm or less can be suitably used by the analysis apparatus and the particle separation/collection apparatus according to the present technology.

Note that if a flow channel P formed on the substrate T is selected to use, the bottom of the flow channel P is preferably formed of a transparent material. As shown in the analysis apparatus of FIG. 5, the purpose of this is to allow optical information from the bottom side of the flow channel P to be detected by disposing a light detection unit 112 described below on an opposite side of the substrate T from the light irradiation unit 111 described below.

(2) Light Irradiation Unit 111

In the light irradiation unit 111, light is emitted to a particle S that is passing through the flow channel P.

The type of the light emitted from the light irradiation unit 111 is not particularly limited. However, in order to ensure that the particle S emits fluorescence and/or scattered light, the light preferably has a constant light direction, a constant wavelength, and a constant light intensity. Examples thereof include a laser, an LED, and the like. Although the type of the laser, if used, is nor particularly limited, an argon ion (Ar) laser, a helium-neon (He—Ne) laser, a dye laser, a krypton (Cr) laser, a semiconductor laser, a solid-state laser having a semiconductor laser and a wavelength conversion optical element in combination, or the like, or an arbitrary combination of two or more thereof may be used.

(3) Light Detection Unit 112

The light detection unit 112 detects optical information provided by the particle S caused by light irradiation by the light irradiation unit 111.

The type of the light detection unit 112 usable in the present technology is not particularly limited as long as the optical information can be detected, and any publicly known light detector may be arbitrarily selected and used. For example, a fluorometer, a scattered light photometer, a transmitted light photometer, a reflected light photometer, a diffracted light photometer, an ultraviolet spectrometer, an infrared spectrometer, a Raman spectrometer, a FRET measurement device, a FISH measurement device, other various spectrometers, and what is called multi-channel light detector having multiple light detectors arranged in an array, or the like, or an arbitrary combination of two or more thereof may be used.

Furthermore, the installation location of the light detection unit 112 each in the analysis apparatus and in the particle separation/collection apparatus according to the present technology is not particularly limited as long as the optical information provided by the particle S can be detected, and can be arbitrarily designed. For example, if scattered light from the particle S having a small scattering angle is to be detected, the installation location is preferably on an opposite side of the flow channel P from the light irradiation unit 111 as shown in FIGS. 5 and 6. This is because disposing the light detection unit 112 on an opposite side of the flow channel P from the light irradiation unit 111 permits the light irradiation unit 111 and the light detection unit 112 to be disposed in a more flexible configuration. In addition, if light is emitted also in a direction different from the incoming direction of the irradiated light, such as fluorescence from the particle S, the installation location may be on the same side of the flow channel P as the light irradiation unit 111, or on a side of the flow channel P at 90 degrees with respect to the light irradiation unit 111.

(4) Analysis Unit 113

In the analysis unit 113, the particle S is analyzed on the basis of the optical information provided by the particle S, detected by the light detection unit 112. This analysis unit 113 is not essential to the analysis apparatus and to the particle separation/collection apparatus according to the present technology, but properties etc. of the particle S may be analyzed on the basis of the optical information detected by the light detection unit 112, by using an external analysis apparatus or the like.

(5) Separation/Collection Unit 121

In the separation/collection unit 121, the particle S is separated/collected on the basis of the optical information detected by the light detection unit 112, or of an analysis result of the particle S analyzed in the analysis unit 113. For example, in the separation/collection unit 121, the particle S can be separated/collected on the basis of analysis results of the size, the form, the internal structure, and/or the like of the particle S analyzed using the optical information at a location downstream of the flow channel P.

More specifically, as shown in FIG. 6, oscillation is applied, for example, to a part or to the entirety of the flow channel P using a vibration element 121a that oscillates at a predetermined frequency to generate droplets from the outlet of the flow channel P. Note that the vibration element 121a used in this situation is not particularly limited, and any publicly known one may be arbitrarily selected and used. Examples thereof include a piezo vibration element. Furthermore, by adjusting the amount of the fluid fed to the flow channel P, the diameter of the outlet, the frequency of the vibration element, etc., the size of the droplets can be adjusted to form droplets that each include a fixed amount of the sample.

Next, the droplets formed are positively or negatively charged on the basis of the analysis results of the size, the form, the internal structure, and/or the like of the particles S analyzed (see those indicated by the symbol 121b in FIG. 6). The electrically charged droplets are then directed to travel in a desired direction by counter electrodes 121c with a voltage being applied thereacross, and the droplets are thus separated/collected.

<4. Control Method>

Figure 7:
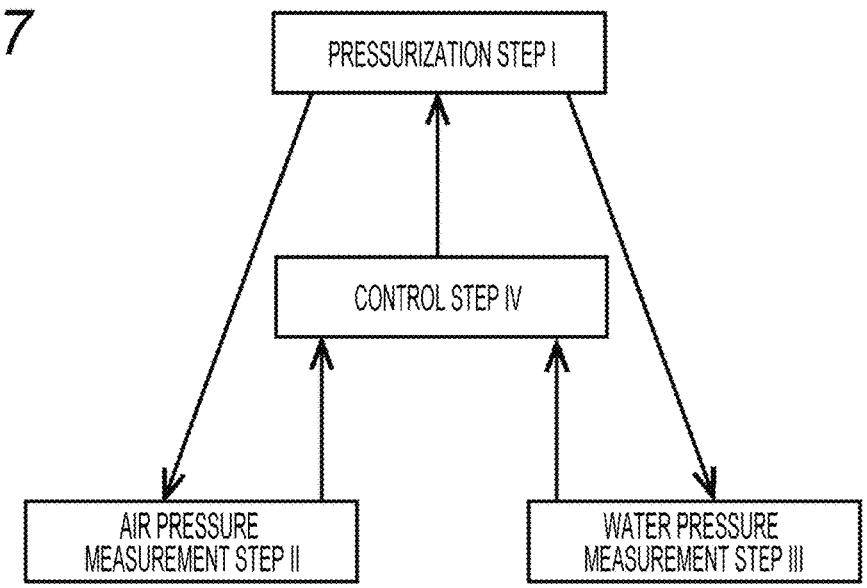
FIG. 7 is a flow diagram of a control method according to the present technology.

FIG. 7 is a flow diagram of a control method according to the present technology. The control method according to the present technology is a control method for controlling a flow velocity of a laminar flow, and is a method that performs at least, in terms of broad groupings, a pressurization step I, an air pressure measurement step II, a water pressure measurement step III, and a control step IV. Note that the details of the pressurization step I, the air pressure measurement step II, the water pressure measurement step III, and the control step IV are the same, respectively, as those described above for the methods performed by the pressurization unit 11, the air pressure measurement unit 12, the water pressure measurement unit 13, and the control unit 14 of the control apparatus 1 according to the present technology, and explanation thereof is thus omitted here.

<5. Analysis Method and Particle Separation/Collection Method>

The control method according to the present technology described above can be suitably used as a laminar flow control method in an analysis method for analyzing the particle S in the laminar flow, and/or in a particle separation/collection method for separating/collecting the particle S in the laminar flow.

Figure 8:
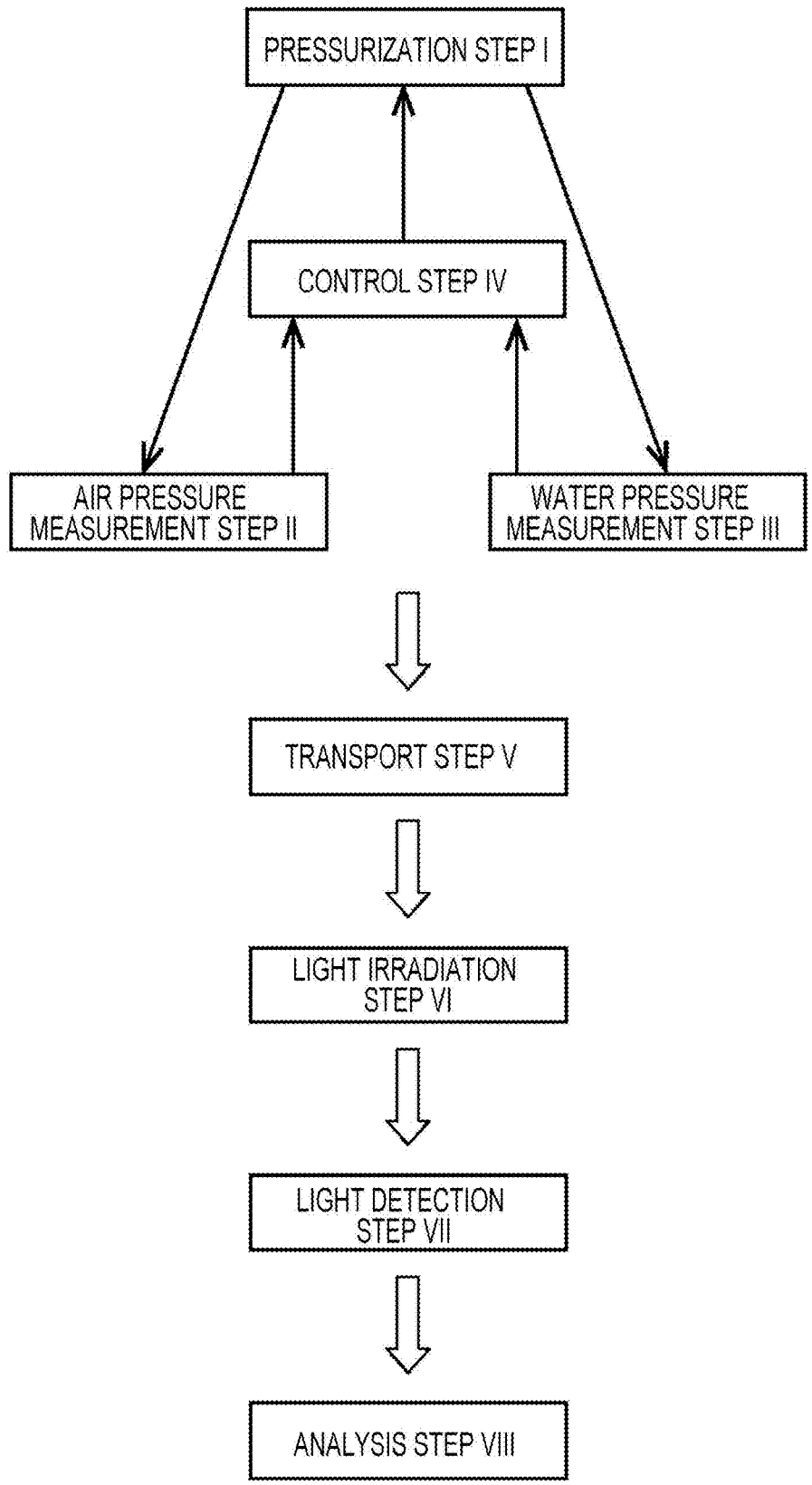
FIG. 8 is a flow diagram of an analysis method according to the present technology.
Figure 9:
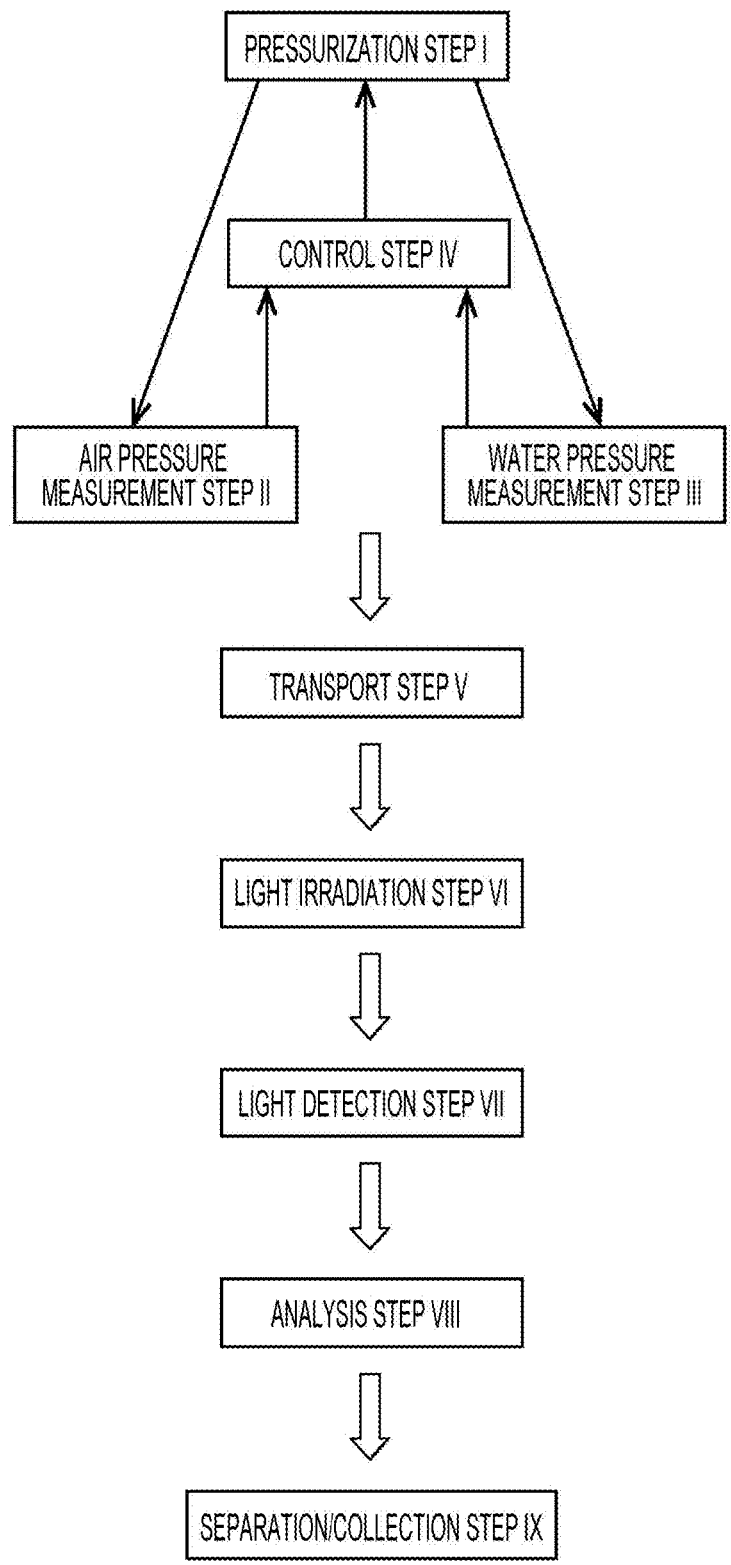
FIG. 9 is a flow diagram of a particle separation/collection method according to the present technology.

FIG. 8 is a flow diagram of an analysis method according to the present technology; and FIG. 9 is a flow diagram of a particle separation/collection method according to the present technology. The pressurization step I, the air pressure measurement step II, the water pressure measurement step III, and the control step IV performed in the analysis method shown in FIG. 8 and in the particle separation/collection method shown in FIG. 9 are the same as those described above, and explanation thereof is thus omitted here.

In addition to the control method according to the present technology described above, the analysis method and the particle separation/collection method according to the present technology may include various steps commonly performed in a publicly known analysis method and particle separation/collection method (such as what is called flow cytometry) and the like. Specifically, a transport step V, a light irradiation step VI, a light detection step VII, an analysis step VIII, a separation/collection step IX, and the like may be performed. Note that the details of the light irradiation step VI, the light detection step VII, the analysis step VIII, and the separation/collection step IX are the same, respectively, as those described above for the methods performed by the light irradiation unit 111, the light detection unit 112, the analysis unit 113, and the separation/collection unit 121 of the analysis apparatus and of the particle separation/collection apparatus according to the present technology, and explanation thereof is thus omitted here.

(1) Transport Step V

The transport step V is a step of transporting the particle S through the laminar flow.

The method for transporting the particle S through the laminar flow is not particularly limited. Examples thereof may include a method including transportation with the sample flow F1 containing the particle S being sandwiched by a fluid medium (sheath flow F2) that facilitates straightening as shown in FIGS. 5 and 6. Transportation in such a manner can form a laminar flow of the sample flow F1 containing the particle S, and is thus more suitable. The type of the fluid medium (sheath flow F2) is not particularly limited as long as the fluid medium has a capability of facilitating straightening of the sample flow F1 containing the particle S. For example, if the particle S is a cell, a physiological saline solution or the like may be used.

The particle S is preferably modified with a labeling substance such as a fluorescent substance (e.g., a fluorescent pigment), a radioactive substance, an intercalator, or a microbead so that optical information will be detectable in the light detection step VII. For example, the type of the fluorescent pigment, if used, is not particularly limited, and any publicly known fluorescent pigment may be used. For example, Cascade Blue, Pacific Blue, fluorescein isothiocyanate (FITC), phycoerythrin (PE), propidium iodide (PI), Texas Red (TR), peridinin-chlorophyll-protein (PerCP), allophycocyanin (APC), 4',6-diamidino-2-phenylindole (DAPI), Cy3, Cy5, Cy7, or the like, or an arbitrary combination of two or more thereof may be used.

Note that if the particle S emits light in itself as does a fluorescent protein, no need exists for modification with a labeling substance. Also, no need exists for modifying the particle S with a labeling substance if a substance is used for the particle S, which substance can, for example, change the fluorescence color of that substance and/or the like as taught in the principle of FRET, by promoting interaction between substances in the flow channel P.

<6. Analysis Program>

An analysis program according to the present technology is a laminar flow control program used for controlling a flow velocity of a laminar flow, and is a program for causing a computer to perform a first control function, a second control function, and a switching control function. Each of these functions will be hereinafter described in detail.

(1) First Control Function

The first control function controls the pressure force applied to the fluid on the basis of the air pressure applied to the fluid that is to form the laminar flow.

(2) Second Control Function

The second control function controls the pressure force applied to the fluid on the basis of water pressure of the fluid that is to form the laminar flow.

(3) Switching Control Function

The switching control function provides switching between performance of the first control function and performance of the second control function. The details of the switching control function are the same as those described above for the switching between air pressure-based control and water pressure-based control provided by the control unit 14 of the control apparatus 1 described above, and explanation thereof is thus omitted here.

EXAMPLES

The present invention will be described below in more detail using Examples. Note that Examples described below are merely examples of representative examples of the present invention, and should not be construed as limiting the scope of the present invention.

Experimental Example 1

In Experimental Example 1, an examination was made of a difference between the times required for the flow velocity of the sheath flow to stabilize, due to the difference of the remaining amount of the sheath when the pressure force applied to the sheath fluid was controlled only on the basis of the water pressure of the sheath flow.

(1) Equipment Setup

Figure 10:
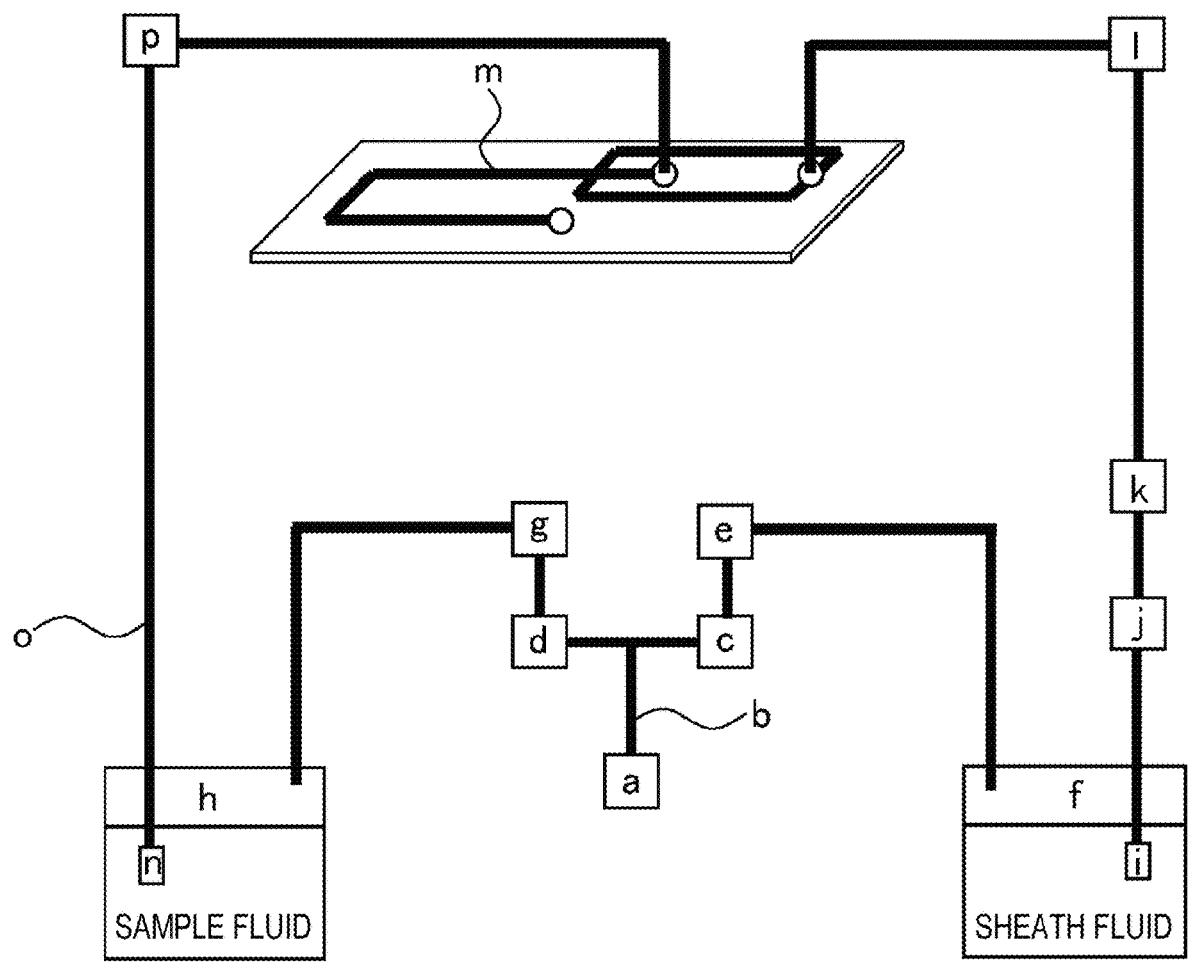
FIG. 10 is a conceptual schematic diagram schematically illustrating an apparatus used in Experimental Examples 1 to 3.

FIG. 10 is a conceptual schematic diagram schematically illustrating an apparatus used in Experimental Examples 1 to 3. In FIG. 10, the symbol "a" indicates a compressor serving as a compressed air source. An air tube b connected to this compressor "a" branches into a pressure-regulating regulator c for the sheath fluid and a pressure-regulating regulator d for the sample fluid. The pressure-regulating regulator c for the sheath fluid is connected to a sheath fluid vessel f (capacity: 10 L) for storing the sheath fluid, with an air pressure sensor e for measuring the pressure applied on the sheath fluid interposed therebetween. In addition, the pressure-regulating regulator d for the sample fluid is connected to a sample fluid vessel h, with an air pressure sensor g for measuring the pressure applied on the sample fluid interposed therebetween. A sheath nozzle i is immersed in the sheath fluid in the sheath fluid vessel f, and is directed into a chip-type flow cell m, with a water pressure sensor (liquid pressure meter) j and sheath fluid inlet control valves k, 1 interposed therebetween. Furthermore, a sample nozzle n is immersed in the sample fluid in the sample fluid vessel h, and a sample tube o connected to the sample nozzle n is directed into the chip-type flow cell m, with a sample fluid inlet valve p interposed therebetween.

(2) Experimental Procedure

Reference Example 1

The sheath fluid vessel f of the apparatus described above was charged with 10.9 kg of the sheath fluid, in which condition the pressure applied to the sheath fluid was adjusted only on the basis of the output of the water pressure sensor j, and feedback control was thus provided to the flow velocity of the sheath fluid. More specifically, control was started under a non-pressurized condition (−8 kPa to −5 kPa), and was provided until the flow velocity of the sheath flow stabilized at 10 m/s (water pressure: about 158.0 kPa).

During the control, the air pressure and the water pressure were monitored using the air pressure sensor e and the water pressure sensor j.

Reference Example 2

Control was provided in the same manner as in Experimental Example 1 except that the sheath fluid vessel f was charged with 2.5 kg of the sheath fluid.

(3) Results

Figure 11:
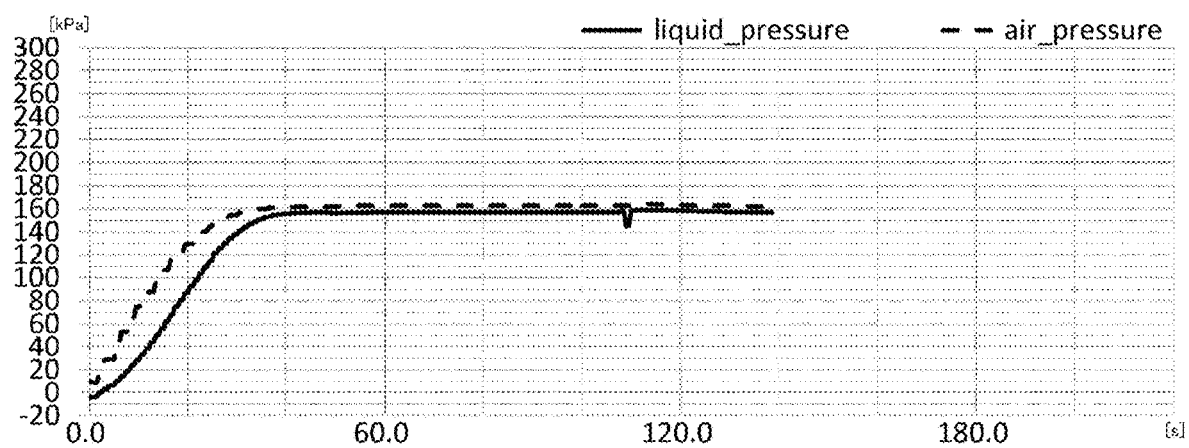
FIG. 11 is a drawing-substitute graph showing changes in an air pressure and in a water pressure in Reference Example 1 of Experimental Example 1.
Figure 12:
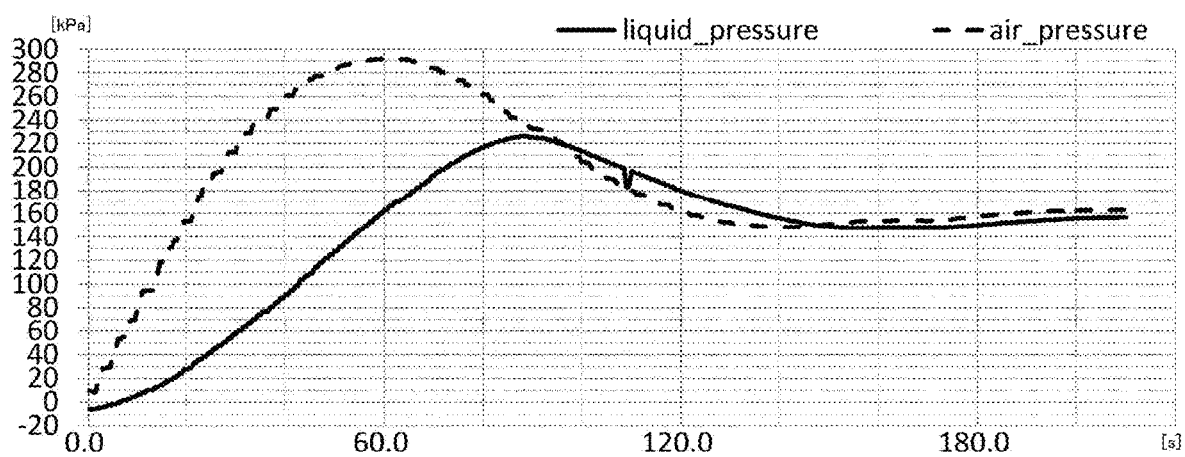
FIG. 12 is a drawing-substitute graph showing changes in an air pressure and in a water pressure in Reference Example 2 of Experimental Example 1.

The changes in the air pressure and in the water pressure in Reference Example 1 are shown in FIG. 11; and the changes in the air pressure and in the water pressure in Reference Example 2 are shown in FIG. 12. As shown in FIG. 11, when the sheath fluid vessel f was almost completely filled with the sheath fluid, the flow velocity stabilized in about 60 seconds. In contrast, as shown in FIG. 12, it has been found that when the amount of the sheath fluid in the sheath fluid vessel f is low, a time lag occurs between the increase of the water pressure and the increase of the air pressure. In addition, both the air pressure and the water pressure exhibited overshoot, and it took 180 seconds or more for the flow velocity to stabilize.

Experimental Example 2

In Experimental Example 2, an examination was made of differences between the times required for the flow velocity of the sheath flow to stabilize when the pressure force applied to the sheath fluid was controlled only on the basis of the water pressure of the sheath flow, and when switching was performed from air pressure-based control to water pressure-based control.

(1) Experimental Procedure

Example 1

The sheath fluid vessel f of the apparatus described above was charged with 2.5 kg of the sheath fluid, in which condition the pressure applied to the sheath fluid was adjusted on the basis of the output of the air pressure sensor e, and feedback control was thus provided to the flow velocity of the sheath fluid; and the pressure applied to the sheath fluid was then adjusted on the basis of the output of the water pressure sensor j, and feedback control was thus provided to the flow velocity of the sheath fluid. More specifically, control was started under a non-pressurized condition (−8 kPa to −5 kPa), which control was based on the output of the air pressure sensor e; and when the differential pressure between the air pressure and the water pressure reaches a value less than 10 kPa, the control was switched to the control based on the output of the water pressure sensor j, and the control was thereafter continued until the flow velocity of the sheath flow stabilized at 10 m/s (water pressure: about 158.0 kPa). During the control, the air pressure and the water pressure were monitored using the air pressure sensor e and the water pressure sensor j.

Comparative Example 1

Control was provided in the same manner as in Reference Example 2 in Example 1.

(2) Results

Figure 13:
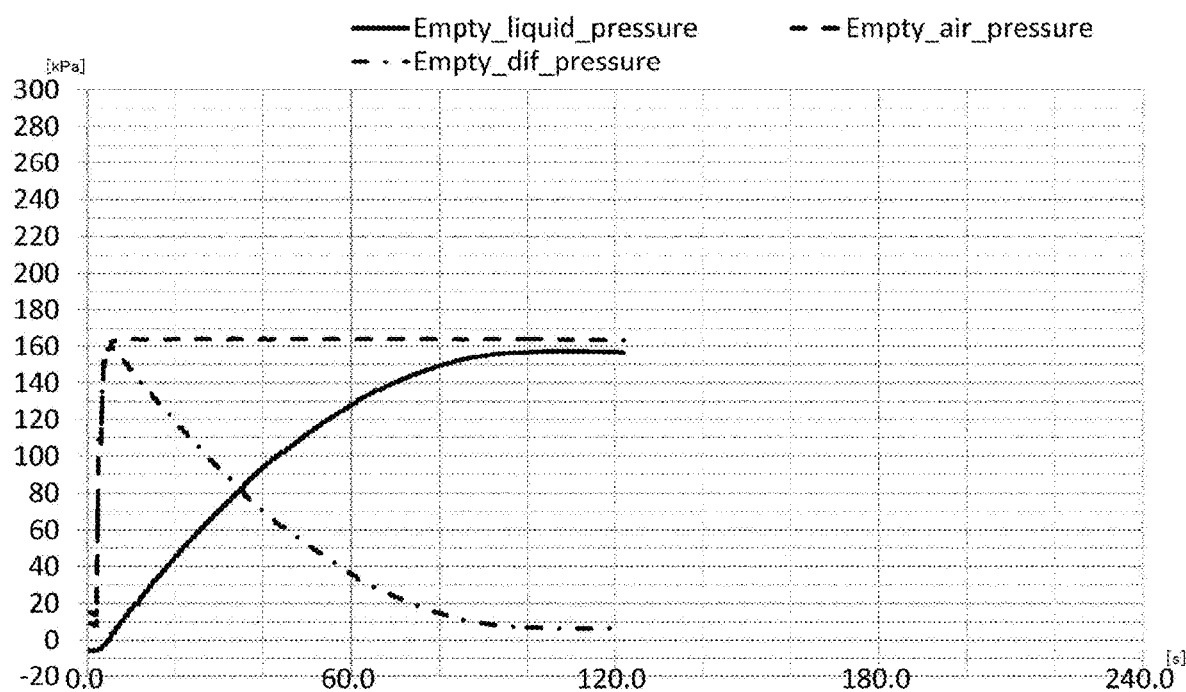
FIG. 13 is a drawing-substitute graph showing changes in an air pressure, in a water pressure, and in a differential pressure between the air pressure and the water pressure in Example 1 of Experimental Example 2.
Figure 14:
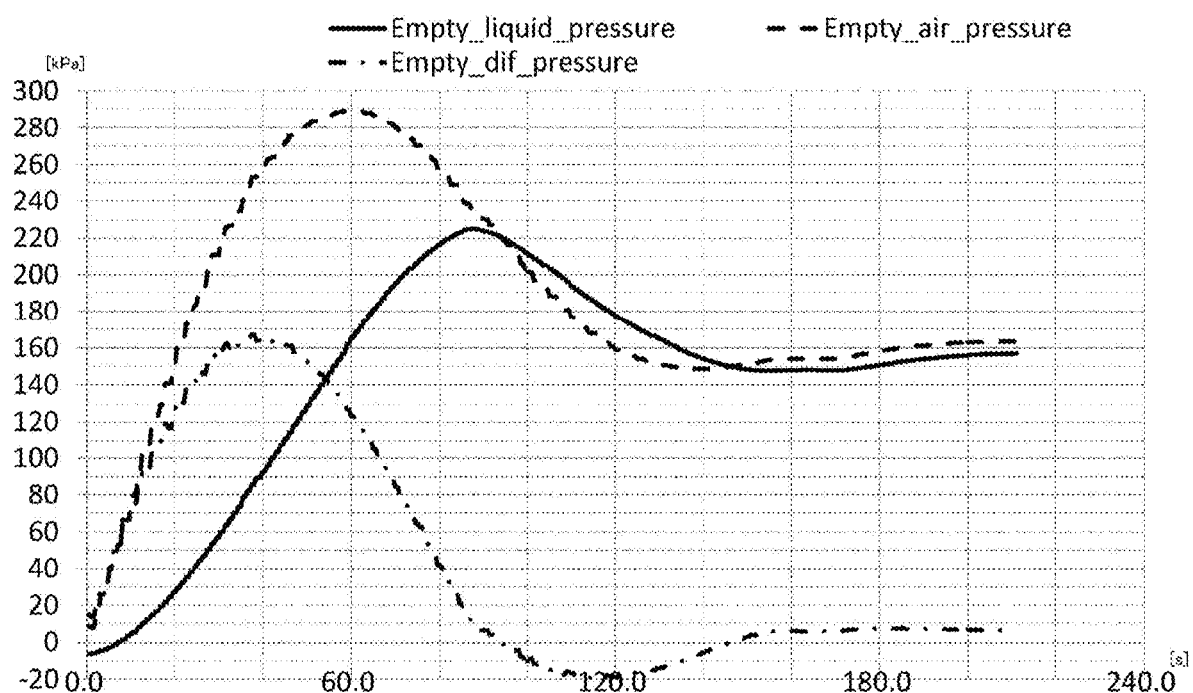
FIG. 14 is a drawing-substitute graph showing changes in an air pressure, in a water pressure, and in a differential pressure between the air pressure and the water pressure in Comparative Example 1 of Experimental Example 2.

The changes in the air pressure, in the water pressure, and in the differential pressure between the air pressure and the water pressure in Example 1 are shown in FIG. 13; and the changes in the air pressure, in the water pressure, and in the differential pressure between the air pressure and the water pressure in Comparative Example 1 are shown in FIG. 14. As shown in FIG. 14, Comparative Example 1, in which control was provided only on the basis of the water pressure, had the result, similarly to Reference Example 2, that a time lag occurred between the increase of the air pressure and the increase of the water pressure, that both the air pressure and the water pressure exhibited overshoot, and that it took 180 seconds or more for the flow velocity to stabilize. In contrast, as shown in FIG. 13, Example 1, in which switching was performed from the air pressure-based control to the water pressure-based control, had the result that even when the amount of the sheath fluid in the sheath fluid vessel f is low, neither the air pressure nor the water pressure exhibited overshoot, and the flow velocity stabilized in about 120 seconds.

Experimental Example 3

In Experimental Example 3, an examination was made of differences between the times required for the flow velocity of the sheath flow to stabilize when the pressure force applied to the sheath fluid was controlled only on the basis of the water pressure of the sheath flow, and when switching was performed from air pressure-based control to water pressure-based control in a similar manner to Example 2, each under a condition that the sheath fluid vessel f was almost completely filled with the sheath fluid, with different target flow velocities of the sheath flow.

(1) Experimental Procedure

Example 2

The sheath fluid vessel f of the apparatus described above was charged with 10.9 kg of the sheath fluid, in which condition the pressure applied to the sheath fluid was adjusted on the basis of the output of the air pressure sensor e, and feedback control was thus provided to the flow velocity of the sheath fluid; and the pressure applied to the sheath fluid was then adjusted on the basis of the output of the water pressure sensor j, and feedback control was thus provided to the flow velocity of the sheath fluid. More specifically, control was started under a non-pressurized condition (−8 kPa to −5 kPa), which control was based on the output of the air pressure sensor e; and when the differential pressure between the air pressure and the water pressure reaches a value less than 10 kPa, the control was switched to the control based on the output of the water pressure sensor j, and the control was thereafter continued until the flow velocity of the sheath flow stabilized at 3 m/s (water pressure: about 33.0 kPa). During the control, the air pressure and the water pressure were monitored using the air pressure sensor e and the water pressure sensor j.

Example 3

Control was provided in a similar manner to Example 2 except that the control was provided until the flow velocity of the sheath flow stabilized at 5 m/s (water pressure: about 62.0 kPa).

Example 4

Control was provided in a similar manner to Example 2 except that the control was provided until the flow velocity of the sheath flow stabilized at 10 m/s (water pressure: about 150.0 kPa).

Example 5

Control was provided in a similar manner to Example 2 except that the sheath fluid vessel f of the apparatus described above was charged with 2.7 kg of the sheath fluid.

Example 6

Control was provided in a similar manner to Example 3 except that the sheath fluid vessel f of the apparatus described above was charged with 2.7 kg of the sheath fluid.

Example 7

Control was provided in a similar manner to Example 4 except that the sheath fluid vessel f of the apparatus described above was charged with 2.7 kg of the sheath fluid.

Comparative Example 2

The sheath fluid vessel f of the apparatus described above was charged with 10.9 kg of the sheath fluid, in which condition the pressure applied to the sheath fluid was adjusted only on the basis of the output of the water pressure sensor j, and feedback control was thus provided to the flow velocity of the sheath fluid. More specifically, control was started under a non-pressurized condition (−8 kPa to −5 kPa), and was provided until the flow velocity of the sheath flow stabilized at 3 m/s (water pressure: about 33.0 kPa). During the control, the air pressure and the water pressure were monitored using the air pressure sensor e and the water pressure sensor j.

Comparative Example 3

Control was provided in a similar manner to Comparative Example 2 except that the control was provided until the flow velocity of the sheath flow stabilized at 5 m/s (water pressure: about 62.0 kPa).

Comparative Example 4

Control was provided in a similar manner to Comparative Example 2 except that the control was provided until the flow velocity of the sheath flow stabilized at 10 m/s (water pressure: about 150.0 kPa).

Comparative Example 5

Control was provided in a similar manner to Comparative Example 2 except that the sheath fluid vessel f of the apparatus described above was charged with 2.7 kg of the sheath fluid.

Comparative Example 6

Control was provided in a similar manner to Comparative Example 3 except that the sheath fluid vessel f of the apparatus described above was charged with 2.7 kg of the sheath fluid.

Comparative Example 7

Control was provided in a similar manner to Comparative Example 4 except that the sheath fluid vessel f of the apparatus described above was charged with 2.7 kg of the sheath fluid.

(2) Results

Figure 15:
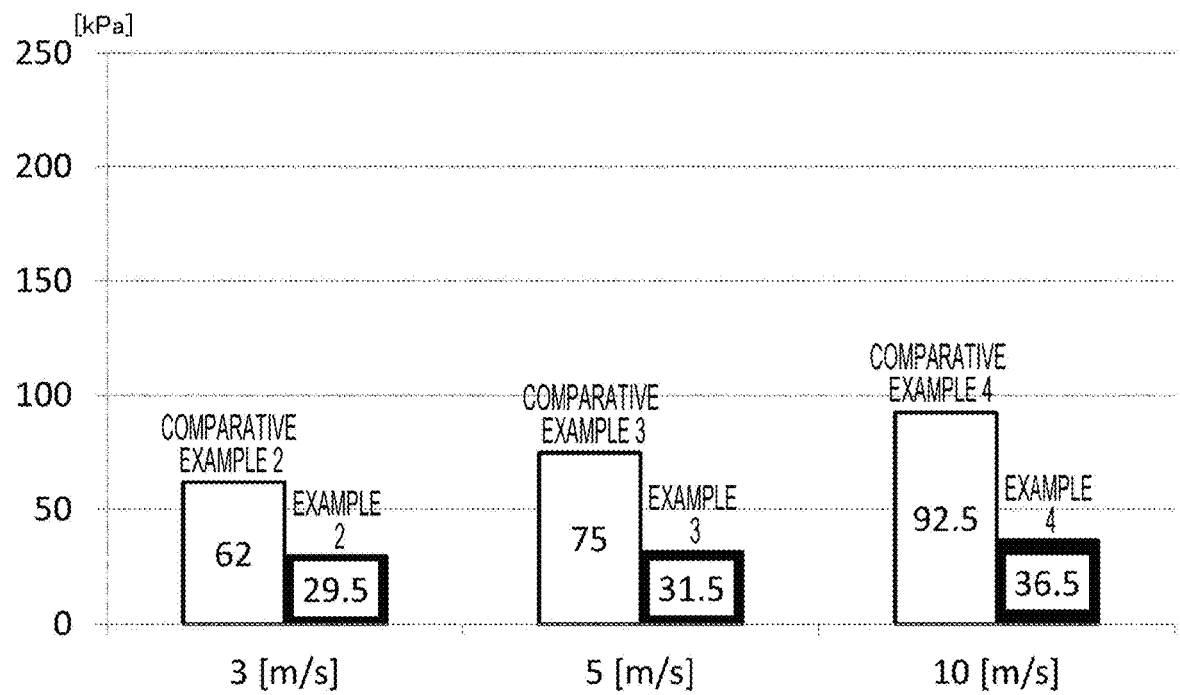
FIG. 15 is a drawing-substitute graph showing times required for the sheath flows to stabilize in Examples 2 to 4 and in Comparative Examples 2 to 4 of Experimental Example 3.
Figure 16:
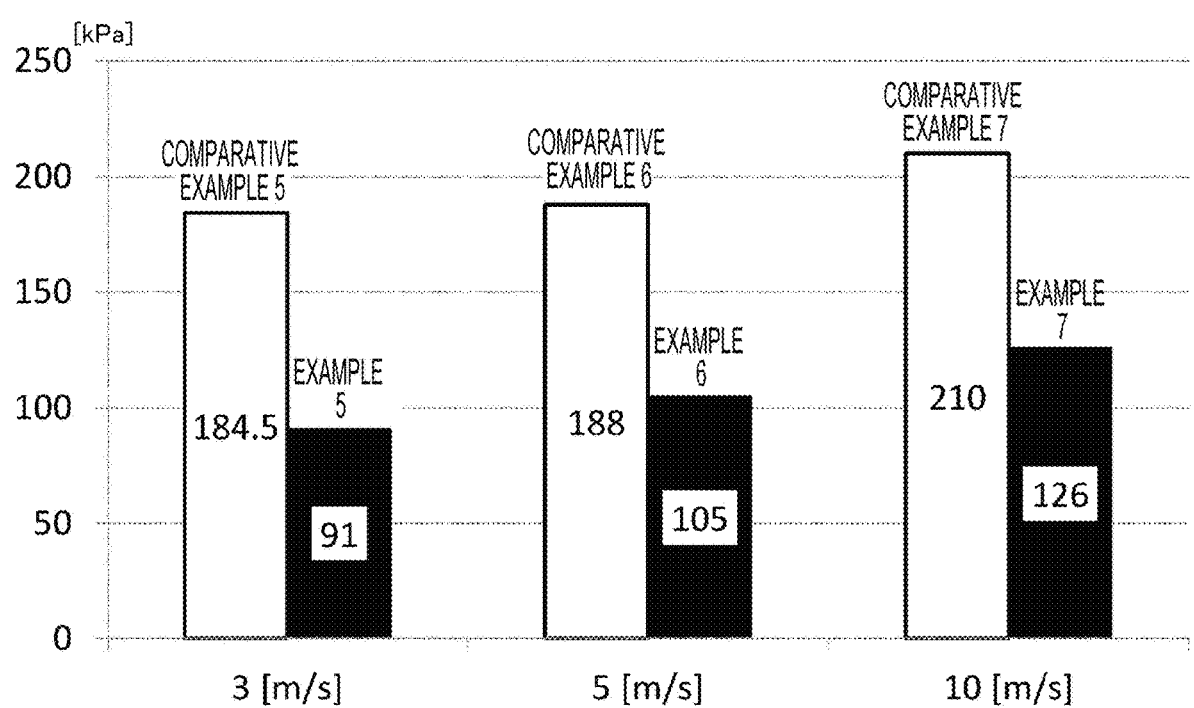
FIG. 16 is a drawing-substitute graph showing times required for the sheath flows to stabilize in Examples 5 to 7 and in Comparative Examples 5 to 7 of Experimental Example 3.

The times required for the sheath flow to stabilize in Examples 2 to 4 and in Comparative Examples 2 to 4 are shown in FIG. 15; and the times required for the sheath flow to stabilize in Examples 5 to 7 and in Comparative Examples 5 to 7 are shown in FIG. 16. As shown in FIG. 15, it has been proved that even when the sheath fluid vessel f was almost completely filled with the sheath fluid, the times required for the flow velocity of the sheath flow to stabilize were all reduced to half or less in Examples 2 to 4, in which switching was performed from the air pressure-based control to the water pressure-based control, as compared to those in Comparative Examples 2 to 4, in which the pressure force applied to sheath fluid was controlled only on the basis of the water pressure of the sheath flow. In particular, comparison between Comparative Example 4 and Example 4, which each set the stabilized flow velocity to 10 m/s, has shown a reduction in the time required for the flow velocity to stabilize by a factor of 2.53 times.

As shown in FIG. 16, it has been proved that even when the amount of the sheath fluid in the sheath fluid vessel f is low, the times required for the flow velocity of the sheath flow to stabilize were all reduced in Examples 5 to 7, in which switching was performed from the air pressure-based control to the water pressure-based control, as compared to those in Comparative Examples 5 to 7, in which the pressure force applied to sheath fluid was controlled only on the basis of the water pressure of the sheath flow. In particular, comparison between Comparative Example 5 and Example 5, which each set the stabilized flow velocity to 3 m/s, has shown a reduction in the time required for the flow velocity to stabilize by a factor of 2.03 times.

REFERENCE SIGNS LIST

1 Control apparatus
11 Pressurization unit
12 Air pressure measurement unit
13 Water pressure measurement unit
14 Control unit
10 Control system
110 Pressurization apparatus
120 Air pressure measurement apparatus
130 Water pressure measurement apparatus
140 Control apparatus
P Flow channel
111 Light irradiation unit
112 Light detection unit
113 Analysis unit
121 Separation/collection unit
I Pressurization step
II Air pressure measurement step
III Water pressure measurement step
IV Control step
V Transport step
VI Light irradiation step
VII Light detection step
VIII Analysis step
IX Separation/collection step

The invention claimed is:

1. A control apparatus for controlling a flow velocity of a laminar flow in a flow channel, the apparatus comprising:
a pressurizer structured to provide air to pressurize an atmosphere above a liquid housed in a container, the air provided above the liquid affecting a flow of the liquid in the flow channel, the flow of the liquid forming at least a part of the laminar flow;
an air-pressure sensor arranged to measure an air pressure of the atmosphere above the liquid;
a water-pressure sensor arranged to measure a water pressure of the flow of the liquid; and
a controller configured to maintain the laminar flow by switching between an air-pressure control mode, in which the pressurizer is controlled based on the air pressure measured by the air-pressure sensor, and a water-pressure control mode, in which the pressurizer is controlled based on the water pressure measured by the water-pressure sensor,
wherein in the air-pressure control mode, the controller controls the pressurizer to provide air to the atmosphere above the liquid based on the air pressure of the atmosphere above the liquid, as measured by the air-pressure sensor,
wherein in the water-pressure control mode, the controller controls the pressurizer to provide air to the atmosphere above the liquid based on the water pressure of the flow of the liquid, as measured by the water-pressure sensor, and
wherein the controller is configured to switch from the air-pressure control mode to the water-pressure control mode after stabilization of the air pressure measured by the air-pressure sensor to within a predetermined range.

2. A control apparatus for controlling a flow velocity of a laminar flow in a flow channel, the apparatus comprising:
a pressurizer structured to provide air to pressurize an atmosphere above a liquid housed in a container, the air provided above the liquid affecting a flow of the liquid in the flow channel, the flow of the liquid forming at least a part of the laminar flow;
an air-pressure sensor arranged to measure an air pressure of the atmosphere above the liquid;
a water-pressure sensor arranged to measure a water pressure of the flow of the liquid; and
a controller configured to maintain the laminar flow by switching between an air-pressure control mode, in which the pressurizer is controlled based on the air pressure measured by the air-pressure sensor, and a water-pressure control mode, in which the pressurizer is controlled based on the water pressure measured by the water-pressure sensor,
wherein in the air-pressure control mode, the controller controls the pressurizer to provide air to the atmosphere above the liquid based on the air pressure of the atmosphere above the liquid, as measured by the air-pressure sensor,
wherein in the water-pressure control mode, the controller controls the pressurizer to provide air to the atmosphere above the liquid based on the water pressure of the flow of the liquid, as measured by the water-pressure sensor, and
wherein the controller is configured to switch from the air-pressure control mode to the water-pressure control mode at one or more time points selected from (a) to (c):
(a) when a differential pressure between the air pressure measured by the air-pressure sensor and the water pressure measured by the water-pressure sensor reaches a predetermined first value or below,
(b) when an amount of variation in the water pressure measured by the water-pressure sensor reaches a predetermined second value or below, and
(c) when a duration of time of the air-pressure control mode exceeds a predetermined time period.

3. The control apparatus according to claim 2, wherein the controller is configured to switch from the air-pressure control mode to the water-pressure control mode after a determination of, in sequential order from (1) to (2) to (3):
  (1) whether the differential pressure between the air pressure measured by the air-pressure sensor and the water pressure measured by the water-pressure sensor has reached the predetermined first value or below,
  (2) whether the amount of variation in the water pressure measured by the water-pressure sensor has reached the predetermined second value or below, and
  (3) whether the duration of time of the air-pressure control mode has exceeded the predetermined time period.

* * * * *